(12) United States Patent
Miyata

(10) Patent No.: US 9,026,109 B2
(45) Date of Patent: May 5, 2015

(54) RADIO BASE STATION AND RADIO COMMUNICATION METHOD

(75) Inventor: Takeo Miyata, Daito (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/056,637

(22) PCT Filed: Jul. 29, 2009

(86) PCT No.: PCT/JP2009/063516
§ 371 (c)(1),
(2), (4) Date: Jan. 28, 2011

(87) PCT Pub. No.: WO2010/013755
PCT Pub. Date: Feb. 4, 2010

(65) Prior Publication Data
US 2011/0136499 A1    Jun. 9, 2011

(30) Foreign Application Priority Data

Jul. 29, 2008  (JP) .................................. 2008-195535

(51) Int. Cl.
| H04W 4/00 | (2009.01) |
| H04W 72/08 | (2009.01) |
| H04J 11/00 | (2006.01) |
| H04W 16/30 | (2009.01) |

(52) U.S. Cl.
CPC ......... *H04W 72/082* (2013.01); *H04J 11/0036* (2013.01); *H04W 16/30* (2013.01)

(58) Field of Classification Search
USPC ........... 455/434, 450, 452.1, 452.2, 464, 509; 370/252
See application file for complete search history.

(56) References Cited

U.S. PATENT DOCUMENTS

| 6,091,954 A * | 7/2000 | Haartsen et al. ............... 455/447 |
| 6,836,473 B1 * | 12/2004 | Eriksson ....................... 370/337 |
| 8,457,645 B2 * | 6/2013 | Craig ............................ 455/450 |

(Continued)

FOREIGN PATENT DOCUMENTS

| CN | 1259265 A | 7/2000 |
| CN | 101167391 A | 4/2008 |

(Continued)

OTHER PUBLICATIONS

Office Action issued on Nov. 5, 2013 in corresponding Chinese Patent Application No. 200980130116.4 (Concise Explanation and translation provided), 12 total pages.

(Continued)

*Primary Examiner* — Kent Chang
*Assistant Examiner* — Nathan Brittingham
(74) *Attorney, Agent, or Firm* — Duane Morris LLP

(57) ABSTRACT

A radio base station allocates a large-interference channel or a small-interference channel to a radio terminal. The radio base station includes: a performance determination unit (121) which determines an interference can performance as a performance to cancellation the affects of interference in the radio terminal or the radio base station; and a channel allocation unit (125) which allocates the large-interference channel or the small-interference channel to the radio terminal in accordance with the interference cancellation performance. The channel allocation unit (125) allocates the small-interference channel with a higher priority than the large-interference channel as the interference cancellation performance increases.

8 Claims, 5 Drawing Sheets

(56) References Cited

U.S. PATENT DOCUMENTS

| | | | |
|---|---|---|---|
| 2005/0271012 A1* | 12/2005 | Agrawal et al. | 370/331 |
| 2007/0099665 A1* | 5/2007 | Kim et al. | 455/561 |
| 2007/0280363 A1* | 12/2007 | Im et al. | 375/260 |
| 2008/0247365 A1* | 10/2008 | Carlsson | 370/337 |
| 2008/0261607 A1 | 10/2008 | Craig | |
| 2009/0196193 A1* | 8/2009 | Frenger et al. | 370/252 |
| 2010/0002785 A1* | 1/2010 | Mantravadi et al. | 375/260 |
| 2010/0034185 A1* | 2/2010 | De Bruin et al. | 370/342 |
| 2010/0214928 A1* | 8/2010 | Nogami et al. | 370/241 |

FOREIGN PATENT DOCUMENTS

| | | | | |
|---|---|---|---|---|
| WO | WO/2007/034860 | * | 3/2007 | H04Q 7/36 |
| WO | WO-2007/049712 A1 | | 5/2007 | |

OTHER PUBLICATIONS

JP 2008-195535 Office Action dated Jul. 26, 2012.
Office Action issued on Mar. 5, 2013 in corresponding Chinese Patent Application No. 200980130116.4, 10 pages.

* cited by examiner

| PRIORITY | BS TRANSMISSION CONTROL | MS RECEPTION CONTROL |
|---|---|---|
| 1 | (EITHER WILL DO) | MLD |
| 2 | ARRAY TRANSMISSION | MMSE (MULTIPLE ANTENNAS Sounding SUPPORT) |
| 3 | ARRAY TRANSMISSION | MMSE (MULTIPLE ANTENNAS Sounding NON-SUPPORT) |
| 4 | NON-ARRAY TRANSMISSION (CCD) | MMSE |
| 5 | ARRAY TRANSMISSION | ZF |
| 6 | NON-ARRAY TRANSMISSION (CCD) | ZF |
| 7 | ARRAY TRANSMISSION | MRC |
| 8 | NON-ARRAY TRANSMISSION (CCD) | MRC |

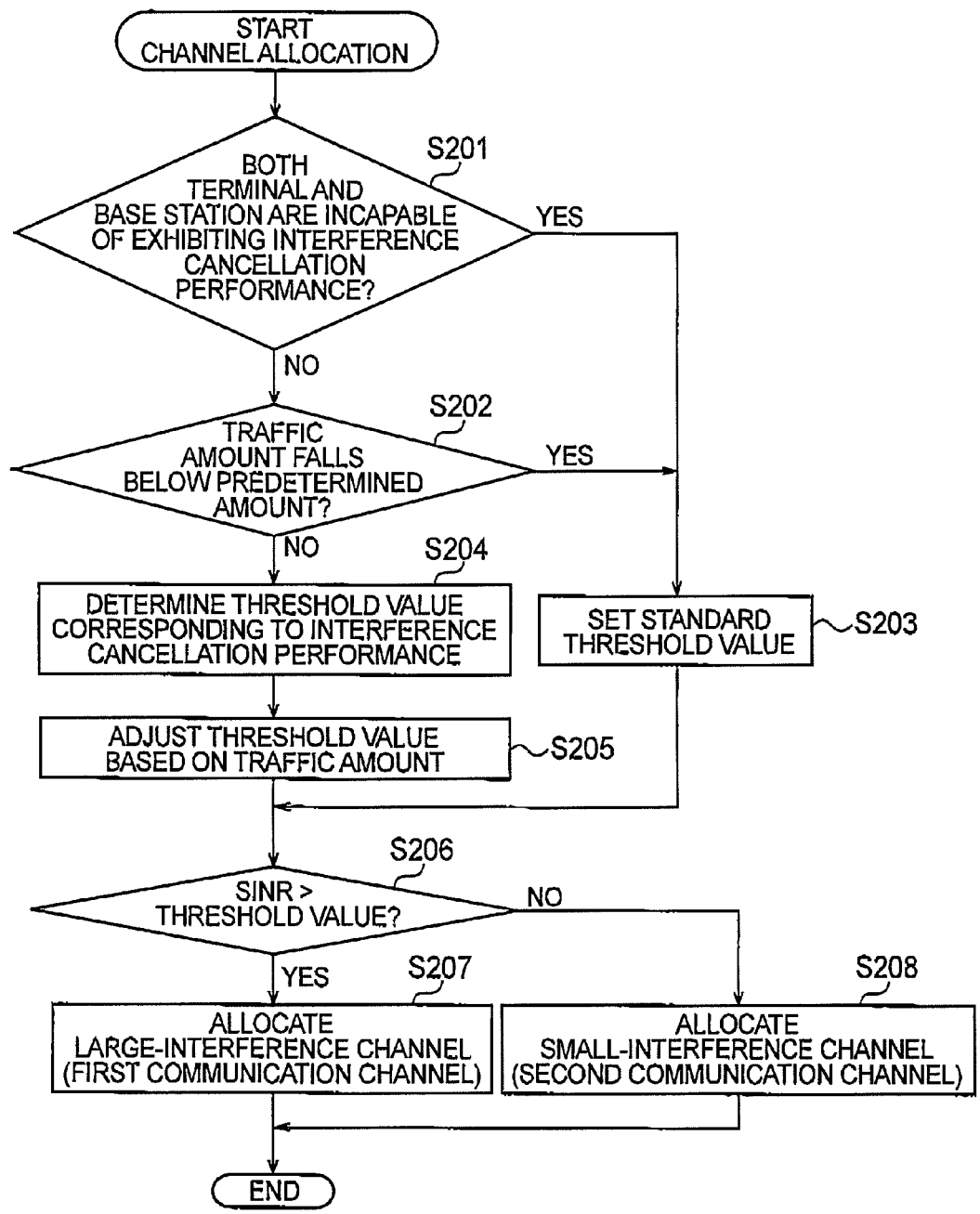

RADIO BASE STATION AND RADIO COMMUNICATION METHOD

CROSS-REFERENCE TO RELATED APPLICATIONS

This is a U.S National Phase Application of International Application No. PCT/JP2009/063516 filed Jul. 29, 2009, which claims priorty to Japanese Patent Application No. 2008-195535 filed Jul. 29, 2008, the disclosures of which are incorporate herein by reference in their entirety.

TECHNICAL FIELD

The present invention relates to a radio base station and a radio communication method for allocating a communication channel to a radio terminal in a radio communication system.

BACKGROUND OF THE INVENTION

In a radio communication system, a radio base station forms a cell that is an area where the radio base station can perform communication, allocates a communication channel to a radio terminal located within the cell, and executes radio communication with the radio terminal via the allocated communication channel. The radio base stations generally allocate, to radio terminals, communication channels having frequencies different between adjacent cells, thereby preventing occurrence of interference.

Meanwhile, to improve frequency utilization efficiency and cell throughput, there has been proposed a technique called fractional frequency reuse (FFR) in which radio base stations use the same frequency as a part of frequencies used by adjacent cells, and thereby purposely use communication channels affected by interference from another radio base station, radio terminal or the like (hereinafter referred to as a "interference source") (see Patent Document 1, for example).

In such FFR, the radio base station allocates a first communication channel more affected by the interference from an interference source to a radio terminal with good reception quality such as reception SINR, more specifically, a radio terminal located near the center of the cell. The first communication channel is a communication channel using the same frequency as that of an adjacent cell.

Meanwhile, the radio base station allocates a second communication channel less affected by the interference from the interference source to a radio terminal with poor reception quality, more specifically, a radio terminal located near the cell edge. The second communication channel is a communication channel using a frequency different from that of an adjacent cell.

Prior Art Document

Patent Document
Patent Document 1: JP-A No. 2008-507215 ([Abstract] etc.)

SUMMARY OF THE INVENTION

The recent development of signal processing technologies has enabled cancellation of the influence of interference in the radio terminal and the radio base station. However, it is very much a situation in which radio base stations and radio terminals with high performance to cancel the interference (hereinafter referred to as interference cancellation performance) are mixed with those with low interference cancellation performance.

For this reason, appropriate channel allocation may not be performed using the conventional method in which the first communication channel or the second communication channel is allocated based on only the reception quality. For example, when many radio terminals are concentrated near the cell edge, the conventional channel allocation method can lead to a case where there is a shortage of allocatable second communication channels whereas there is a surplus of allocatable first communication channels.

As a result, there has been a problem that the frequency utilization efficiency and cell throughput cannot always be improved by the conventional channel allocation method.

Therefore, it is an objective of the present invention to provide a radio base station and a radio communication method which are capable of further improving frequency utilization efficiency and cell throughput by achieving channel allocation that enables a radio terminal or the radio base station to exhibit maximum interference cancellation performance.

In order to solve the problems described above, the present invention has the following features. First of all, according to a first feature of the present invention, there is provided a radio base station (radio base station BS1) comprising: a channel allocation unit (channel allocation unit 125) configured to allocate one of a first communication channel (large-interference channel) and a second communication channel (small-interference channel) to a radio terminal (radio terminal MS), the first communication channel affected by interference from an interference source (e.g. radio base station BS2, radio base station BS3), the second communication channel less affected by the interference from the interference source than the first communication channel; a radio communication unit (radio communication unit 110) configured to execute radio communication with the radio terminal via a communication channel allocated by the channel allocation unit; and a performance determination unit (performance determination unit 121) configured to determine interference cancellation performance that is performance to cancel the influence of interference in at least one of the radio To terminal and the radio base station. The channel allocation unit allocates one of the first communication channel and the second communication channel to the radio terminal based on the interference cancellation performance determined by the performance determination unit.

The radio base station described above achieves channel allocation enabling the radio terminal or the radio base station to exhibit maximum interference cancellation performance, thereby making it possible to further improve frequency utilization efficiency and cell throughput.

In the first feature, the channel allocation unit allocates the first communication channel with higher priority over the second communication channel to the radio terminal as the interference cancellation performance is higher.

In the first feature, the channel allocation unit allocates the second communication channel with higher priority over the first communication channel to the radio terminal as the interference cancellation performance is lower.

In the first feature, the radio base station further comprises: a quality acquisition unit (quality acquisition unit 123) configured to acquire reception quality of a radio signal received by the radio terminal from the radio base station, wherein the channel allocation unit allocates one of the first communication channel and the second communication channel to the radio terminal based on the interference cancellation performance determined by the performance determination unit and the reception quality acquired by the quality acquisition unit.

In the first feature, the channel allocation unit includes a comparison unit (comparison unit 127) configured to compare the reception quality with a threshold value, a threshold value control unit (threshold value control unit 126) configured to control the threshold value in accordance with the interference cancellation performance, and an allocation execution unit (allocation execution unit 128) configured to allocate the first communication channel to the radio terminal when the reception quality exceeds the threshold value, and allocate the second communication channel to the radio terminal when the reception quality falls below the threshold value. The threshold value control unit decreases the threshold value as the interference cancellation performance is higher, and increases the threshold value as the interference cancellation performance is lower.

In the first feature, the radio base station further comprises: a traffic amount acquisition unit (traffic amount acquisition unit 122) configured to acquire a traffic amount transmitted and received by the radio base station during radio communication, wherein the channel allocation unit allocates one of the first communication channel and the second communication channel to the radio terminal based on the interference cancellation performance determined by the performance determination unit, the reception quality acquired by the quality acquisition unit, and the traffic amount acquired by the traffic amount acquisition unit.

In the first feature, the channel allocation unit determines whether or not the traffic amount exceeds a predetermined amount, the channel allocation unit executes channel allocation based on both of the interference cancellation performance and the reception quality, when determining that the traffic amount exceeds the predetermined amount, and the channel allocation unit executes channel allocation based on the reception quality, while omitting channel allocation based on the interference cancellation performance, when determining that the traffic amount falls below the predetermined amount.

In the first feature, the channel allocation unit includes a comparison unit (comparison unit 127) configured to compare the reception quality with a threshold value, a threshold value control unit (threshold value control unit 126) configured to control the threshold. value in accordance with the interference cancellation performance and the traffic amount, and an allocation execution unit (allocation execution unit 128) configured to allocate the first communication channel to the radio terminal when the reception quality exceeds the threshold value, and allocate the second communication channel to the radio terminal when the reception quality falls below the threshold value. The threshold value control unit decreases the threshold value as the traffic amount is larger, and increases the threshold value as the traffic amount is smaller.

In the first feature, the radio communication unit uses an orthogonal frequency multiple access scheme to execute radio communication with the radio terminal.

According to a second feature of the present invention, there is provided a radio communication method comprising the steps of: determining (step S102), by a radio base station, cancellation performance that is performance to cancel the influence of interference in at least one of a radio terminal and the radio base station; allocating (step S104), by the radio base station, one of a first communication channel and a second communication channel to a radio terminal based on the interference cancellation performance determined in the determining step, the first communication channel affected by interference from an interference source, the second communication channel less affected by the interference from the interference source than the first communication channel; and executing radio communication between the radio terminal and the radio base station via the communication channel allocated in the allocating step.

According to a third feature of the present invention, there is provided a program for executing the steps of: determining, by a radio base station, cancellation performance that is performance to cancel the influence of interference in at least one of a radio terminal and the radio base station; allocating, by the radio base station, one of a first communication channel and a second communication channel to a radio terminal based on the interference cancellation performance determined in the determining step, the first communication channel affected by interference from an interference source, the second communication channel less affected by the interference from the interference source than the first communication channel; and executing radio communication between the radio terminal and the radio base station via the communication channel allocated in the allocating step.

The present invention can provide a radio base station and a radio communication method, which are capable of further improving frequency utilization efficiency and cell throughput by achieving channel allocation that enables a radio terminal or the radio base station to exhibit maximum interference cancellation performance.

BRIEF DESCRIPTION OF THE DRAWINGS

FIG. 7 is a flowchart showing detailed operations of the radio base station according to the embodiment of the present invention.

EMBODIMENTS FOR CARRYING OUT THE INVENTION

Figure 1:
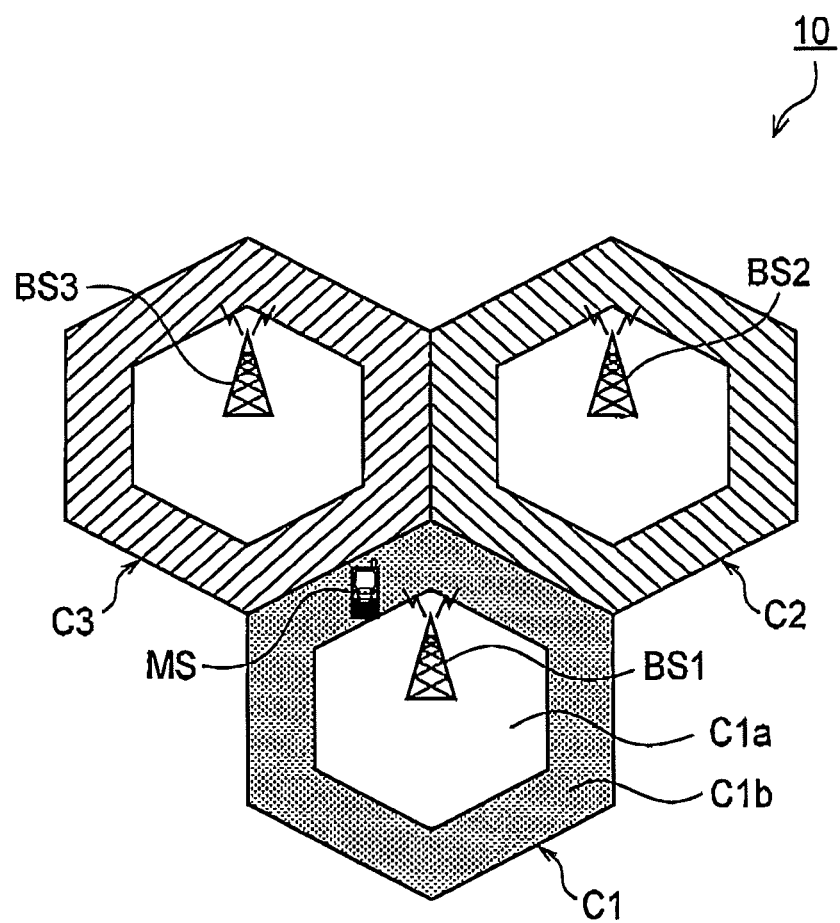
FIG. 1 is a general configuration diagram of a radio communication system according to an embodiment of the present invention.

Next, a radio communication system according to an embodiment of the present invention is described in the order of (1) General Overall Configuration, (2) Configuration of Radio Base Station, (3) Example of Threshold Value Information, (4) Operations of Radio Communication System, (5) Advantageous Effects, and (6) Other Embodiments. In the following description of the drawings in the embodiment, the same or similar parts are denoted by the same or similar reference numerals.

(1) General Overall Configuration

First, a general description is given of the radio communication system according to this embodiment in the order of (1.1) General Configuration of Radio Communication System and (1.2) Example of FFR.

(1.1) General Configuration of Radio Communication System

FIG. 1 is a general configuration diagram of a radio communication system 10 according to this embodiment. In this embodiment, for convenience of description, the radio communication system 10 including three radio base stations (a radio base station BS1, a radio base station BS2 and a radio base station BS3) is described, but the radio communication system may include more radio base stations.

An orthogonal frequency division multiple access (OFDMA) scheme that is one of multi-carrier communication schemes each using multiple carriers is employed in the radio communication system 10. In the OFDMA scheme, a communication channel using multiple carriers is dynamically allocated to a radio terminal. The communication channel is specified by a combination of frequency and time.

In the radio communication system 10, both of a transmitting side and a receiving side have multiple antennas, and radio signals can be transmitted and received using the multiple antennas. More specifically, MIMO (Multi-Input Multi-Output) technology is introduced into the radio communication system 10.

In the MIMO technology, multiple signal series using the same frequency band are simultaneously transmitted via the multiple antennas on the transmitting side, and the signal series are received via the multiple antennas on the receiving side, thereby performing separation of the signal series. There are various types of signal processing technologies used for separation of the signal series. The more advanced the signal separation method used, the higher the interference cancellation performance on the receiving side.

Also, the transmitting side can support adaptive array transmission. In the adaptive array transmission, the transmitting side sets the transmission directivity of an antenna unit (array antenna) including multiple antennas toward the receiving side. To be more specific, radio waves from the multiple antennas are spatially synthesized to set the directivity (a to region with a strong electrolytic distribution) toward the receiving side. When the transmitting side supports the adaptive array transmission, reception SINR characteristics on the terminal side are improved, thereby further improving the resistance to interference.

The radio base station BS1 forms a cell C1, the radio base station BS1 forms a cell C2, and the radio base station BS1 forms a cell C3. A radio terminal MS is located in the cell C1. Although FIG. 1 shows only one radio terminal MS, there are actually many radio terminals located in the cells C1 to C3, respectively.

In this embodiment, the radio base stations BS1 to BS3 execute channel allocation based on the FFR described above. In the FFR, each of the radio base stations divides resources (frequency and time) usable for radio communication into two zones, a large-interference zone and a small-interference zone, and forms communication channels using these zones. For example, the radio base station allocates a communication channel formed using the large-interference zone to a radio terminal, and allocates a communication channel formed using the small-interference zone to another radio terminal.

The large-interference zone is a zone where the radio base stations BS1 to BS3 have the same frequency and time. A frequency reuse factor RF in the large-interference zone is 1, and this zone is hereinafter called Reuse 1 zone. The small-interference zone is a zone where the radio base stations BS1 to BS3 have different frequencies and times. In this embodiment, a frequency reuse factor RF in the small-interference zone is 3, and this zone is hereinafter called Reuse 3 zone. Moreover, a communication channel to be formed using Reuse 1 zone is called a large-interference channel (first communication channel), and a communication channel to be formed using Reuse 3 zone is called a small-interference channel (second communication channel).

The following description is mainly given of a case where the radio base station BS1 allocates a communication channel to the radio terminal MS in downlink (DL) communication. The radio base station BS1 allocates one of the large-interference channel and the small-interference channel to the radio terminal MS in accordance with reception quality (SINR) and the like notified by the radio terminal MS. Specifically, the large-interference channel is affected by the interference from the radio base stations BS2 and BS3, while the small-interference channel is less affected by the interference from the radio base stations BS2 and BS3 than the large-interference channel.

(1.2) Example of FFR

Figure 2:
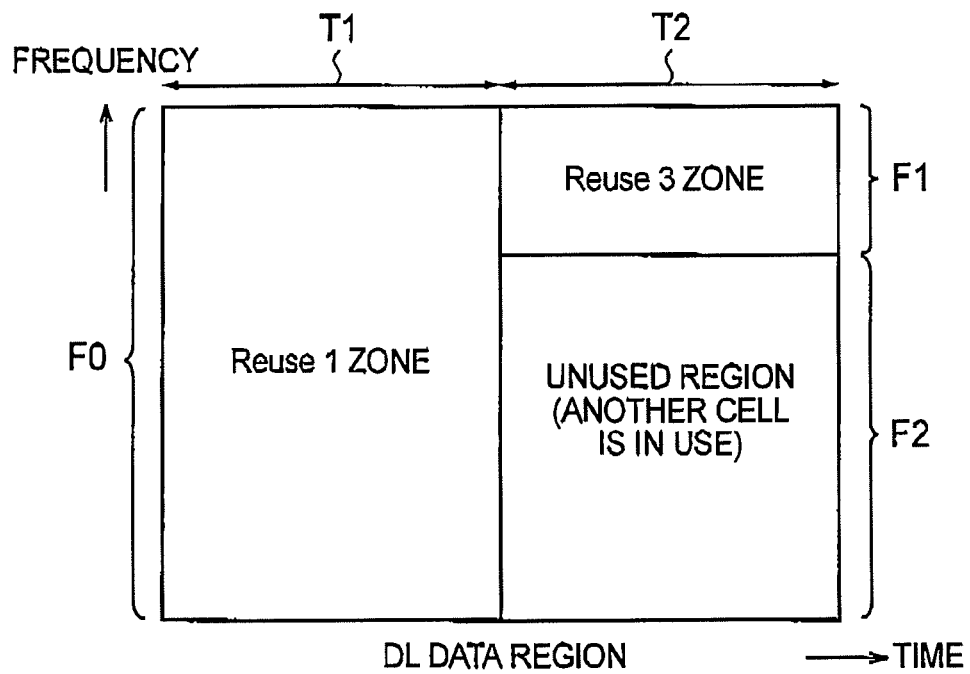
FIG. 2 is a diagram showing an example of allocation of resources to be used by a radio base station for downlink data communication according to the embodiment of the present invention.

Next, with reference to FIGS. 1 and 2, an example of FFR applied to the radio communication system 10 is described. FIG. 2 shows an example of allocation of resources (frequency and time) to be used by the radio base station BS1 for DL data communication.

As shown in FIG. 2, the radio base station BS1 sets a frequency F0 zone, which is shared by the radio base stations BS1 to BS3 during a time T1, as Reuse 1 zone. The radio base station BS1 sets a frequency F1 zone during a time T2 as Reuse 3 zone. The radio base station BS1 cannot use a frequency F2 zone during the time T2, since the other radio base stations, i.e., the radio base stations BS2 and BS3 use the frequency F2 zone as Reuse 3 zone.

In the example shown in FIG. 2, Reuse 3 zone used by the radio base station BS1 is smaller than Reuse 1 zone. In other words, a resource amount in Reuse 1 zone is larger than that in Reuse 3 zone. For this reason, the radio base station BS1 can allocate more resources (frequency and time) to the radio terminal by using Reuse 1 zone rather than using Reuse 3 zone.

In normal FFR, when allocating a communication channel to a radio terminal with good reception quality, such as one located near the center C1a of the cell C1, the radio base station BS1 specifies an unallocated portion of Reuse 1 zone, and allocates the large-interference channel including at least a part of the specified unallocated portion. Meanwhile, when allocating a communication channel to a radio terminal with poor reception quality, such as one located near the cell edge C1b of the cell C1, the radio base station BS1 specifies an unallocated portion of Reuse 3 zone, and allocates the small-interference channel including at least a part of the specified unallocated portion.

The radio base station BS1 performs channel allocation taking into consideration interference cancellation performance of the radio base station BS1 and the radio terminal MS, in addition to the channel allocation described above. For example, even when allocating a communication channel to the radio terminal MS with poor reception quality, such as one located near the cell edge C1b, the radio base station BS1 allocates the large-interference channel to the radio terminal MS when it is determined that the radio base station BS1 or the radio terminal MS has high interference cancellation performance.

(2) Configuration of Radio Base Station

Next, the configuration of the radio base station BS1 is described in the order of (2.1) General Configuration of Radio Base Station and (2.2) Detailed Configuration of Radio Base Station. Note that since the radio base stations BS2 and BS3 have the same configuration as that of the radio base station BS1, a description of the radio base stations BS2 and BS3 is omitted.

(2.1) General Configuration of Radio Base Station

Figure 3:
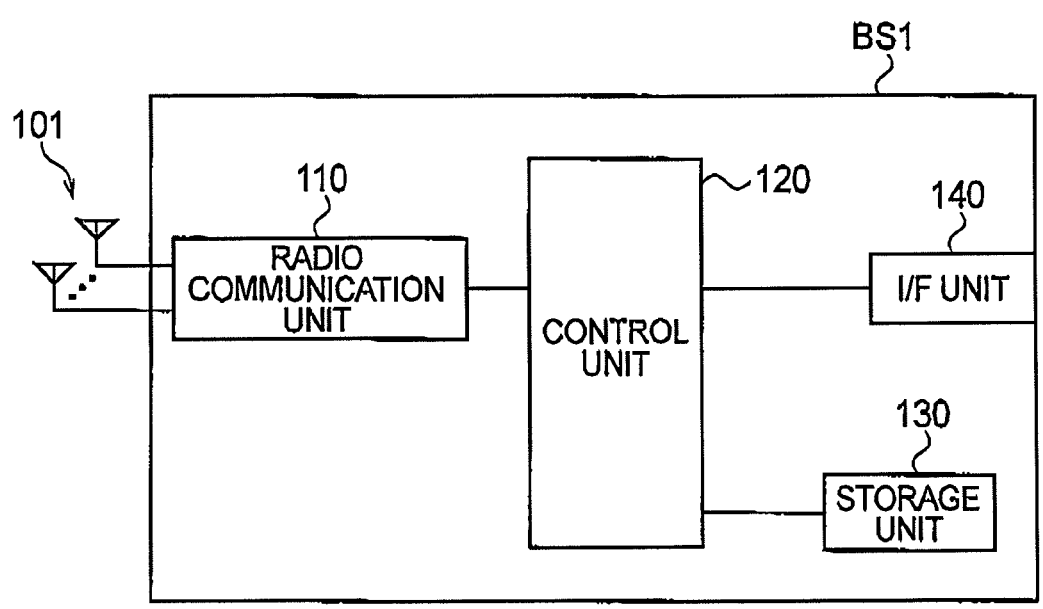
FIG. 3 is a block diagram showing a general configuration of the radio base station according to the embodiment of the present invention.

FIG. 3 is a block diagram showing a general configuration of the radio base station BS1. As shown in FIG. 3, the radio base station BS1 includes an antenna unit 101, a radio communication unit 110, a control unit 120, a storage unit 130 and an I/F unit 140.

The antenna unit 101 includes multiple antennas, and is configured as an array antenna, for example.

The radio communication unit 110 executes radio communication with the radio terminal MS by using the OFDMA scheme. To be more specific, the radio communication unit 110 includes a low noise amplifier, a power amplifier, an up-converter, a down-converter, a baseband processor, and the like, and performs transmission and reception of radio signals according to the OFDMA scheme. Further, the radio communication unit 110 also executes signal processing using the MIMO technology described above.

The control unit 120 is formed of a CPU, for example, and controls various functions included in the radio base station BS1. The storage unit 130 is formed of a memory, for example, and stores various information to be used for control and the like in the radio base station BS1. The I/F unit 140 is connected is by a wire to an unillustrated backbone network.

(2.2) Detailed Configuration of Radio Base Station

Figures 4, 5:
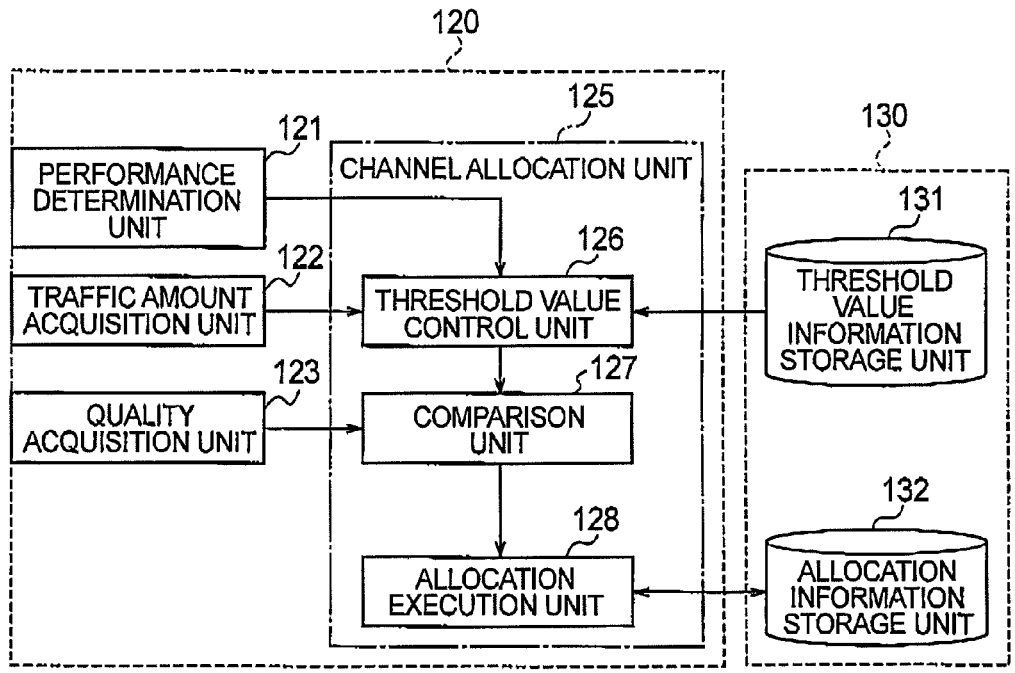
FIG. 4 is a block diagram showing a detailed configuration of the radio base station according to the embodiment of the present invention.
FIG. 5 is a diagram showing an example of threshold value information stored in a threshold value information storage unit according to the embodiment of the present invention.

FIG. 4 is a block diagram showing a detailed configuration of the radio base station BS1, more specifically, functional blocks of the control unit 120 and the storage unit 130. FIG. 4 shows only the functional blocks related to the present invention.

As shown in FIG. 4, the control unit 120 includes a performance determination unit 121, a traffic amount acquisition unit 122, a quality acquisition unit 123, and a channel allocation unit 125. The storage unit 130 includes a threshold value information storage unit 131 and an allocation information storage unit 132.

The performance determination unit 121 determines interference cancellation performance that is performance to cancel the influence of interference in each of the radio terminal MS and the radio base station BS1. The performance determination unit 121 determines the interference cancellation performance of the radio terminal MS based on a notification from the radio terminal MS. Alternatively, the performance determination unit 121 may determine the interference cancellation performance of the radio terminal MS based on a notification from a management server (not shown) or the like, which is connected to the backbone network. The interference cancellation performance of the radio base station BS1 is preliminarily stored in the storage unit 130, thereby allowing the performance determination unit 121 to determine the interference cancellation performance of the radio base station BS1.

The traffic amount acquisition unit 122 acquires a traffic amount (total traffic amount) of transmissions and receptions by the radio base station BS1 during radio communication. The traffic amount is not limited to a current traffic amount, but may be a traffic amount of a predetermined time ago or the like. In the DL communication, for example, the traffic amount acquisition unit 122 can acquire the traffic amount by measuring an amount of untransmitted data stored in a transmission buffer provided in the storage unit 130. Alternatively, the traffic amount acquisition unit 122 may acquire the number of radio terminals during execution of radio communication with the radio base station BS1, as the traffic amount.

The quality acquisition unit 123 acquires reception quality of a radio signal the radio terminal MS has received from the radio base station BS1. The radio base station BS1 regularly transmits, within the cell C1, a signal (such as a pilot signal) known to the radio terminal MS. Meanwhile, the radio terminal MS measures reception quality upon receipt of the signal, and notifies the radio base station BS1 of the measured reception quality. The quality acquisition unit 123 can acquire the reception quality in the radio terminal MS from the notification. Note that not only the signal-to-interference noise power ratio (SINR) described above but also received signal field intensity (RSSI) and the like may be used as the reception quality.

The channel allocation unit 125 allocates one of a large-interference channel and a small-interference channel to the radio terminal MS based on the interference cancellation performance determined by the performance determination unit 121, the traffic amount acquired by the traffic amount acquisition unit 122, and the reception quality acquired by the quality acquisition unit 123.

To be more specific, the channel allocation unit 125 allocates a large-interference channel with higher priority over a small-interference channel to the radio terminal MS as the interference cancellation performance determined by the performance determination unit 121 is higher. On the other hand, the channel allocation unit 125 allocates a small-interference channel with higher priority over a large-interference channel to the radio terminal MS as the interference cancellation performance determined by the performance determination unit 121 is lower.

The channel allocation unit 125 further includes a threshold value control unit 126, a comparison unit 127 and an allocation execution unit 128.

The comparison unit 127 compares the reception quality acquired by the quality acquisition unit 123 with a threshold value Th. The threshold value control unit 126 controls the threshold value Th in accordance with the interference cancellation performance determined by the performance determination unit 121 and the traffic amount acquired by the traffic amount acquisition unit 122.

The allocation execution unit 128 allocates one of a large-interference channel and a small-interference channel to the radio terminal MS based on the comparison result obtained by the comparison unit 127. To be more specific, the allocation execution unit 128 allocates the large-interference channel to the radio terminal MS when the reception quality exceeds the threshold value Th, and allocates the small-interference channel to the radio terminal MS when the reception quality falls below the threshold value Th.

The allocation execution unit 128 performs channel allocation by referring to allocation information stored in the allocation information storage unit 132. The allocation information means information on allocated resources or on unallocated resources. After executing the channel allocation, the allocation execution unit 128 updates the allocation information by setting resources of the communication channel allocated as the "allocated resources".

The threshold value control unit 126 controls the threshold value Th by referring to threshold value information stored in the threshold value information storage unit 131. The threshold value control unit 126 decreases the threshold value as the interference cancellation performance is higher, and increases the threshold value as the interference cancellation performance is lower. As a result, the large-interference channel is more likely to be allocated to the radio terminal MS as the interference cancellation performance is higher, while the small-interference channel is more likely to be allocated to the radio terminal MS as the interference cancellation performance is lower.

(3) Example of Threshold Value Information

FIG. 5 is a diagram showing an example of threshold value information stored in the threshold value information storage unit 131.

In FIG. 5, the higher the value of "Priority" (the smaller the value), the higher the preference given to the large-interference channel, in other words, the smaller the threshold value.

Priority 1 indicating the highest priority means a case where the receiving side (the radio terminal MS) supports MLD (Maximum Likelihood Detection) that is one of the signal separation schemes, and where the interference cancellation performance is at its maximum. Note, however, that when the transmitting side (the radio base station BS1) supports the adaptive array transmission, so the interference cancellation performance is further improved. Since the MLD is for estimating a maximum-likelihood signal from all signal candidates, computational effort is increased. As a result, the radio terminal MS with low processing capability cannot adopt the MLD.

Priorities 2 and 3 mean a case where the transmitting side (the radio base station BS1) supports the adaptive array transmission and the receiving side (the radio terminal MS) supports MMSE (Minimum Mean Square Error) that is one of the signal separation schemes. In FIG. 5, multiple antenna sounding is a technology to enhance the accuracy of the adaptive array transmission.

Priority 4 means a case where the transmitting side (the radio base station BS1) does not support the adaptive array transmission and the receiving side (the radio terminal MS) supports MMSE (Minimum Mean Square Error). When the adaptive array transmission is not supported, CDD (Cyclic Delay Diversity) is used, in which a frequency diversity effect is obtained by changing the timing between systems of OFDM modulated signals.

ZF (Zero forcing) in Priorities 5 and 6 is one of the signal separation schemes, and is an algorithm having interference cancellation performance lower than that of the MLD or MMSE. MRC (Maximum Ratio Combining) in Priorities 7 and 8 is an algorithm for maximum-ratio-combining the signals received by the respective antennas, and has low interference cancellation performance.

(4) Operations of Radio Communication System

Next, operations of the radio communication system 10 are described in the order of (4.1) General Operations of Radio Communication System and (4.2) Detailed Operation Example of Radio Base Station.

(4.1) General Operations of Radio Communication System

Figure 6:
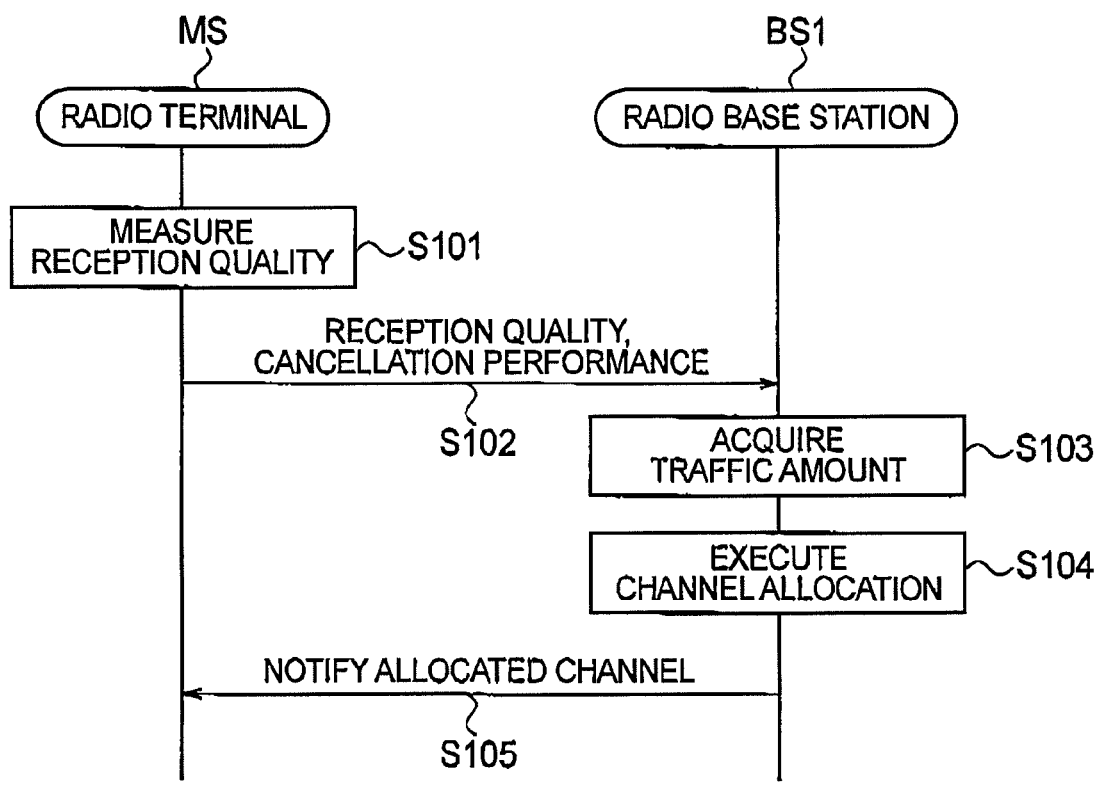
FIG. 6 is a sequence diagram showing general operations of the radio communication system according to the embodiment of the present invention.

FIG. 6 is a sequence diagram showing general operations of the radio communication system 10.

In Step S101, the radio terminal. MS measures reception quality of a radio signal received from the radio base station BS1. Here, it is assumed that the radio terminal MS measures a reception SINR as the reception quality.

In Step S102, the radio terminal MS notifies the radio base station BS1 of the reception quality (reception SINR) measured in Step S101. Note that the radio terminal MS may notify a reception quality index value (index) instead of notifying the reception quality as it is.

In this event, the radio terminal MS notifies the radio base station BS1 of information identifying the interference cancellation algorithm (e.g., such as MLD or MMSE) which is supported by the radio terminal MS. However, the radio terminal MS may notify the radio base station BS1 of a value indicating the level of interference cancellation performance, instead of such identification information.

In Step S103, the radio base station BS1 acquires a traffic amount transmitted and received by the radio base station BS1.

In Step S104, the radio base station BS1 executes channel allocation processing. The channel allocation processing will be described in detail later.

In Step S105, the radio base station BS1 notifies the radio terminal MS of the communication channel allocated in Step S104. After Step S105, the radio base station BS1 and the radio terminal MS execute radio communication via the communication channel allocated to the radio terminal MS.

(4.2) Detailed Operation Example of Radio Base Station

FIG. 7 is a flowchart showing detailed operations of the radio base station BS1, more specifically, details of Step S104 shown in FIG. 6.

In Step S201, the threshold value control unit 126 determines whether or not the radio terminal MS and the radio base station BS1 are incapable of exhibiting the interference cancellation performance, based on the interference cancellation performance determined by the performance determination unit 121. When both the radio terminal MS and the radio base station BS1 are incapable of exhibiting the interference cancellation performance, the threshold value control unit 126 sets a predetermined standard threshold value Th in the comparison unit 127.

When at least one of the radio terminal MS and the radio base station BS1 has the interference cancellation performance, the processing advances to Step S202. In Step S202, the threshold value control unit 126 determines whether or not the traffic amount acquired by the traffic amount acquisition unit 122 falls below a predetermined amount. When the traffic amount falls below the predetermined amount, the threshold value control unit 126 sets the predetermined standard threshold value Th in the comparison unit 127.

On the other hand, when the traffic amount exceeds the predetermined amount, the processing advances to Step S204. In Step S204, the threshold value control unit 126 determines the threshold value Th corresponding to the interference cancellation performance determined by the performance determination unit 121, by referring to the threshold value information stored in the threshold value information storage unit 131.

In Step S205, the threshold value control unit 126 adjusts the threshold value Th determined in Step S204, based on the traffic amount acquired by the traffic amount acquisition unit 122.

Here, the threshold value control unit 126 decreases the threshold value Th as the traffic amount is larger, and increases the threshold value Th as the traffic amount is smaller. As a result, the large-interference channel is more likely to be allocated as the traffic amount is larger, while the small-interference channel is more likely to be allocated as the traffic amount is smaller.

In Step S206, the comparison unit 127 compares the reception quality (reception SINR) acquired by the quality acquisition unit 123 with the threshold value Th.

When the reception quality (reception SINR) is higher than the threshold value Th, the processing advances to Step S207. In Step S207, the allocation execution unit 128 allocates the large-interference channel to the radio terminal MS.

On the other hand, when the reception quality (reception SINR) is equal to or lower than the threshold value Th, the processing advances to Step S208. In Step S208, the allocation execution unit 128 allocates the small-interference channel to the radio terminal MS.

(5) Advantageous Effects

As described above, the channel allocation unit 125 allocates the large-interference channel with higher priority over the small-interference channel to the radio terminal MS as the interference cancellation performance in at least one of the radio terminal MS and the radio base station BS1 is higher. This achieves channel allocation that enables the radio terminal MS or the radio base station BS1 to exhibit maximum interference cancellation performance, thereby making it possible to further improve frequency utilization efficiency and cell throughput.

In this embodiment, the channel allocation unit 125 allocates the small-interference channel with higher priority over the large-interference channel to the radio terminal MS as the interference cancellation performance in at least one of the radio terminal MS and the radio base station BS1 is lower. For this reason, when the interference cancellation performance of the radio terminal MS or the radio base station BS1 is low, the small-interference channel is allocated to the radio terminal MS, thereby allowing the radio terminal MS to execute stable radio communication.

In this embodiment, the channel allocation unit 125 allocates one of the large-interference channel and the small-interference channel to the radio terminal MS based on the interference cancellation performance determined by the performance determination unit 121 and the reception quality acquired by the quality acquisition unit 123. To be more specific, the threshold value control unit 126 of the channel allocation unit 125 decreases the threshold value to be compared with the reception quality as the interference cancellation performance is higher, and increases the threshold value as the interference cancellation performance is lower. This enables channel allocation taking into consideration both of the reception quality and the interference cancellation performance. As a result, more stable communication quality can be achieved in the radio terminal around the cell edge while realizing improvement in frequency utilization efficiency and cell throughput.

In this embodiment, the channel allocation unit 125 executes the channel allocation based on the traffic amount acquired by the traffic amount acquisition unit 122 as well as the interference cancellation performance and the reception quality. To be more specific, the channel allocation unit 125 executes channel allocation based on the reception quality while omitting channel allocation based on the interference cancellation performance when it is determined that the traffic amount falls below the predetermined amount. When the traffic amount is small, the inprocessability of the radio base station BS1 can be reduced by executing the channel allocation in the same manner as the conventional method.

Further, the threshold value control unit 126 of the channel allocation unit 125 decreases the threshold value Th as the traffic amount is larger, and increases the threshold value Th as the traffic amount is smaller. In other words, the large-interference channel is more likely to be allocated as the traffic amount is larger, while the small-interference channel is more likely to be allocated as the traffic amount is smaller. When the resource amount in Reuse 1 zone is larger than that in Reuse 3 zone and the traffic amount is large, there arises a problem that the resource amount in Reuse 1 zone is more than necessary and, on the other hand, the resource amount in Reuse 3 zone is insufficient. Such a problem can be avoided by actively allocating the large-interference channel when the traffic amount is large.

(6) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the embodiment described above, the channel allocation unit 125 allocates one of the large-interference channel and the small-interference channel to the radio terminal MS based on the interference cancellation performance determined by the performance determination unit 121, the traffic amount acquired by the traffic amount acquisition unit 122, and the reception quality acquired by the quality acquisition unit 123.

However, the channel allocation unit 125 may allocate one of the large-interference channel and the small-interference channel to the radio terminal MS based on only the interference cancellation performance determined by the performance determination unit 121. In this case, the channel allocation unit 125 may allocate the large-interference channel when the interference cancellation performance is higher than the predetermined level, and may allocate the small-interference channel when the interference cancellation performance is lower is than the predetermined level.

Alternatively, the channel allocation unit 125 may allocate one of the large-interference channel and the small-interference channel to the radio terminal MS based on the interference cancellation performance and the reception quality without taking into consideration the traffic amount. In this case, Steps S202 and S205 in FIG. 7 are not required.

The radio base station BS1 executes the channel allocation taking into consideration the interference cancellation performance of both of the radio base station BS1 and the radio terminal MS in the embodiment described above, but may execute channel allocation taking into consideration the interference cancellation performance of only one of the radio base station BS1 and the radio terminal MS. In this case, the example of threshold value information stored in the threshold value information storage unit 131 (FIG. 5) needs to include the items of neither the transmitting side (the radio base station BS1) nor the receiving side (the radio terminal MS).

Although the description has been given mainly of the DL channel allocation in the embodiment described above, the present invention is also applicable to uplink (UL) channel allocation.

Although there has been no particular mention of radio communication standards of the radio communication system 10 in the embodiment described above, the radio communication system 10 may be configured in conformity with LTE (Long Term Evolution) whose standards are pending in next-generation PHS (Personal Handyphone System), mobile WiMAX (IEEE802.16e) or 3GPP, or with UMB (Ultra Mobile Broadband) whose standards are pending in 3GPP2, for example.

Note that the respective processing procedures described above may be implemented as a computer program, and the radio base station may be allowed to execute the computer program.

As described above, it should be understood that the present invention includes various embodiments and the like which are not described herein. Therefore, the present invention is limited only by items specific to the invention according to claims pertinent based on the foregoing disclosure.

Industrial Applicability

The radio base station and the radio communication method according to the present invention are useful in a radio communication technology such as mobile communication since they achieve channel allocation that enables the radio terminal or the radio base station to exhibit maximum interference cancellation performance, thereby making it possible to further improve frequency utilization efficiency and cell throughput.

The invention claimed is:

1. A radio base station comprising:
a channel allocation unit configured to allocate one of a first communication channel and a second communication channel to a radio terminal, the first communication channel affected by interference from an interference source, the second communication channel less affected by the interference from the interference source than the first communication channel;
a radio communication unit configured to execute radio communication with the radio terminal via a communication channel allocated by the channel allocation unit; and
a performance determination unit configured to determine interference cancellation performance, wherein interference cancellation performance is a measure of an ability of one or more controls to cancel the influence of interference in at least one of the radio terminal and the radio base station, wherein the channel allocation unit allocates one of the first communication channel and the second communication channel to the radio terminal based on the interference cancellation performance determined by the performance determination unit; and
a quality acquisition unit configured to acquire reception quality of a radio signal received by the radio terminal from the radio base station, wherein the channel allocation unit allocates one of the first communication channel and the second communication channel to the radio terminal based on the interference cancellation performance determined by the performance determination unit and the reception quality acquired by the quality acquisition unit and wherein the channel allocation unit includes:
a comparison unit configured to compare the reception quality with a threshold value,
a threshold value control unit configured to control the threshold value in accordance with the interference cancellation performance, wherein the threshold value control unit decreases the threshold value as the interference cancellation performance is higher, and increases the threshold value as the interference cancellation performance is lower, and
an allocation execution unit configured to allocate the first communication channel to the radio terminal when the reception quality exceeds the threshold value, and allocate the second communication channel to the radio terminal when the reception quality falls below the threshold value.

2. The radio base station according to claim 1, wherein the channel allocation unit allocates the first communication channel with higher priority over the second communication channel to the radio terminal as the interference cancellation performance is higher.

3. The radio base station according to claim 1, wherein the channel allocation unit allocates the second communication channel with lower priority over the first communication channel to the radio terminal as the interference cancellation performance is lower.

4. The radio base station according to claim 1, further comprising:

a traffic amount acquisition unit configured to acquire a traffic amount transmitted and received by the radio base station during radio communication, wherein
the channel allocation unit allocates one of the first communication channel and the second communication channel to the radio terminal based on the interference cancellation performance determined by the performance determination unit, the reception quality acquired by the quality acquisition unit, and the traffic amount acquired by the traffic amount acquisition unit.

5. The radio base station according to claim 4, wherein
the channel allocation unit determines whether or not the traffic amount exceeds a predetermined amount,
the channel allocation unit executes channel allocation based on both of the interference cancellation performance and the reception quality, when determining that the traffic amount exceeds the predetermined amount, and
the channel allocation unit executes channel allocation based on the reception quality, while omitting channel allocation based on the interference cancellation performance, when determining that the traffic amount falls below the predetermined amount.

6. The radio base station according to claim 4, wherein
the channel allocation unit includes
a comparison unit configured to compare the reception quality with a threshold value,
a threshold value control unit configured to control the threshold value in accordance with the interference cancellation performance and the traffic amount, and
an allocation execution unit configured to allocate the first communication channel to the radio terminal when the reception quality exceeds the threshold value, and allocate the second communication channel to the radio terminal when the reception quality falls below the threshold value,
wherein the threshold value control unit decreases the threshold value as the traffic amount is larger, and increases the threshold value as the traffic amount is smaller.

7. The radio base station according to claim 1, wherein
the radio communication unit uses an orthogonal frequency multiple access scheme to execute radio communication with the radio terminal.

8. A radio communication method comprising the steps of:
determining, by a radio base station, interference cancellation performance, wherein interference cancellation performance is a measure of an ability of one or more controls to cancel the influence of interference in at least one of a radio terminal and the radio base station;
allocating, by the radio base station, one of a first communication channel and a second communication channel to a radio terminal based on the interference cancellation performance determined in the determining step, the first communication channel affected by interference from an interference source, the second communication channel less affected by the interference from the interference source than the first communication channel;
executing radio communication between the radio terminal and the radio base station via the communication channel allocated in the allocating step; and
acquiring reception quality of a radio signal received by the radio terminal from the radio base station,
allocating one of the first communication channel and the second communication channel to the radio terminal based on the interference cancellation performance determined and the reception quality acquired wherein allocating includes:

comparing the reception quality with a threshold value, controlling the threshold value in accordance with the interference cancellation performance, wherein the threshold value is decreased as the interference cancellation performance is higher, and increased as the interference cancellation performance is lower, and allocating the first communication channel to the radio terminal when the reception quality exceeds the threshold value, and allocating the second communication channel to the radio terminal when the reception quality falls below the threshold value.

* * * * *